Sept. 27, 1960  M. M. KOLLANDER  2,954,239
TANDEM AXLE RUNNING GEAR FOR TRAILERS
Filed Dec. 31, 1956  4 Sheets-Sheet 1
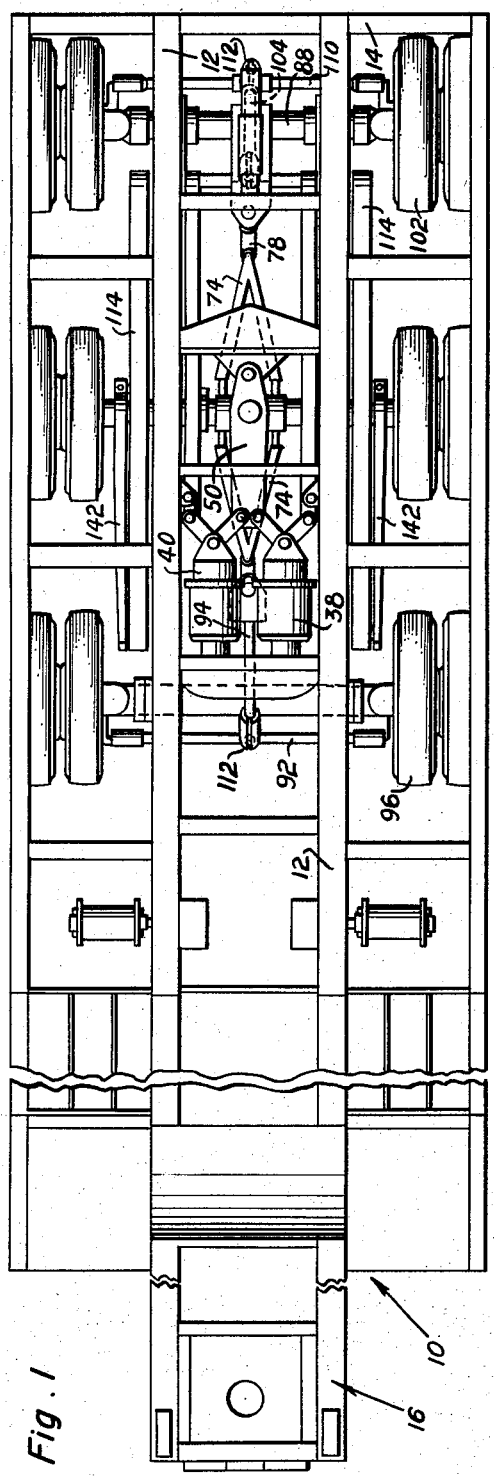
Fig. 1
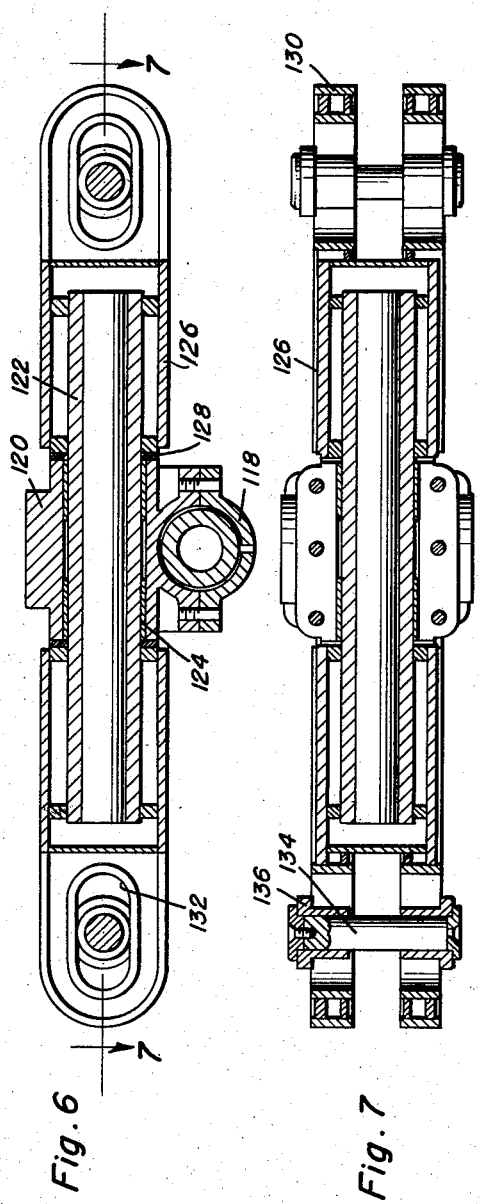
Fig. 6
Fig. 7
Melvin M. Kollander
INVENTOR.
BY
Attorneys

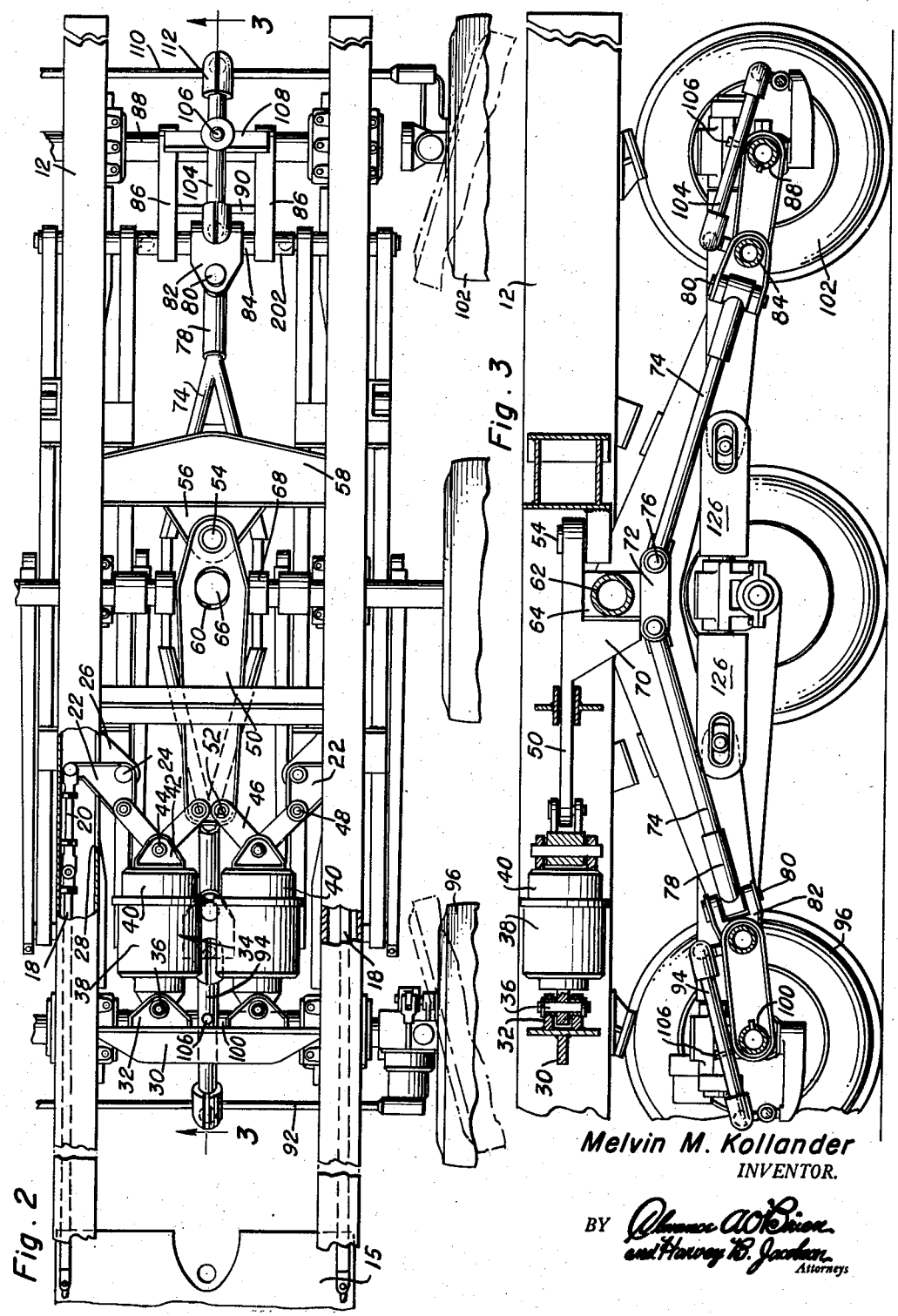

Sept. 27, 1960 M. M. KOLLANDER 2,954,239
TANDEM AXLE RUNNING GEAR FOR TRAILERS
Filed Dec. 31, 1956 4 Sheets-Sheet 3

Melvin M. Kollander
INVENTOR.

Sept. 27, 1960   M. M. KOLLANDER   2,954,239
TANDEM AXLE RUNNING GEAR FOR TRAILERS
Filed Dec. 31, 1956   4 Sheets-Sheet 4
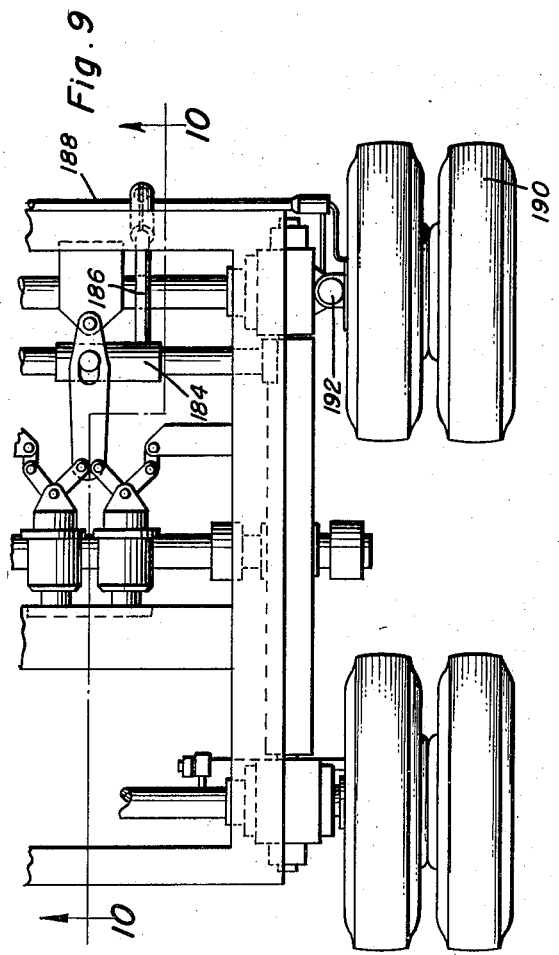
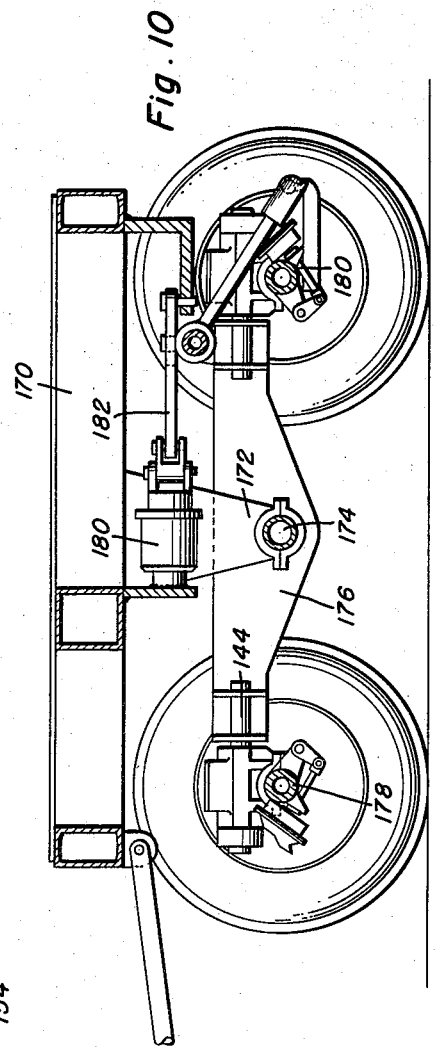
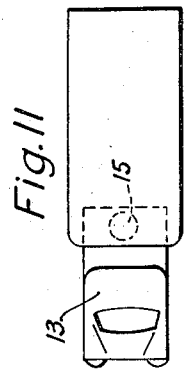
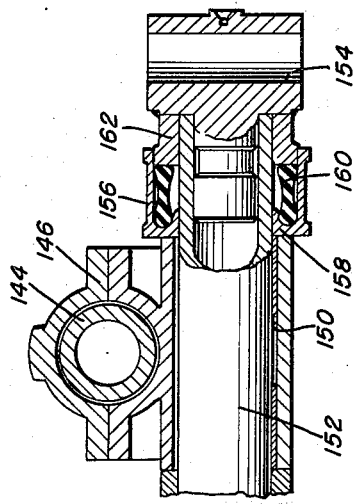
Melvin M. Kollander
INVENTOR.
BY Clarence A. O'Brien
and Harvey B. Jacobson
Attorneys United States Patent Office
2,954,239
Patented Sept. 27, 1960

2,954,239
TANDEM AXLE RUNNING GEAR FOR TRAILERS
Melvin M. Kollander, Albuquerque, N. Mex.
(Sandia Park, N. Mex.)
Filed Dec. 31, 1956, Ser. No. 631,597
12 Claims. (Cl. 280—426)

The present invention generally relates to a vehicle axle suspension arrangement and more particularly to a tandem axle running gear for trailer or semi-trailer type vehicles.

In the construction of large truck vehicles, the load permitted on such vehicles has generally been increased by increasing the number of load carrying axles with these axles being interconnected in a tandem arrangement. The present invention deals specifically with the inter-relationship between the tandem axles and the manner of suspending the same from the trailer bed in which an entirely new concept of controlling the relative movement between the axles is provided and an entirely new concept of inter-relating the tandem axles is provided.

Another important object of the present invention is to provide a tandem axle running gear in accordance with the preceding object in which the rear axle in a two-axle arrangement or the front and rear axle in a three-axle arrangement are steerable for assisting in the maneuvering of the trailer about a curve to reduce side skid and raking of the tires thus reducing the tire wear.

A further object of the present invention is to provide an assembly in accordance with the preceding objects in which the centrifugal force exerted by the load being carried by the trailer assists in the steering of the wheels on the front and rear axles.

Another object of the present invention is to provide a tandem axle running gear for trailers in which the construction is simplified, rugged, dependable, safe, long-wearing and relatively easy to maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the three-axle tandem axle arrangement with the trailer bed being skeletonized;

Figure 2 is an enlarged plan view of the suspension and steering construction for the suspension system;

Figure 3 is a longitudinal, vertical sectional view taken substantially upon a plane passing along section line 3—3 of Figure 2 illustrating further structural details of the suspension arrangement and the steering control mechanism;

Figure 6 is a detailed sectional view taken substantially upon a plane passing along section line 6—6 of Figure 4 illustrating the manner of attaching the central arm to the central axle;

Figure 7 is a detailed sectional view taken substantially upon a plane passing along section line 7—7 of Figure 6 showing further details of the rocker arm;

Figure 8 is a detailed sectional view taken substantially upon the plane passing along section line 8—8 of Figure 4 illustrating the manner of attaching the suspension systems to the front and rear axles to permit limited sliding movement in relation to the axle by compressing a rubber sleeve;

Figure 9 is a partial plan view illustrating a two axle tandem arrangement with a modified suspension system and steering control;

Figure 10 is a longitudinal sectional view taken substantially upon a plane passing along section line 10—10 of Figure 9 illustrating further details of this form of the invention; and Figure 11 is a schematic plan view of the tractor unit, trailer and interconnecting fifth wheel assembly.

Figure 4:
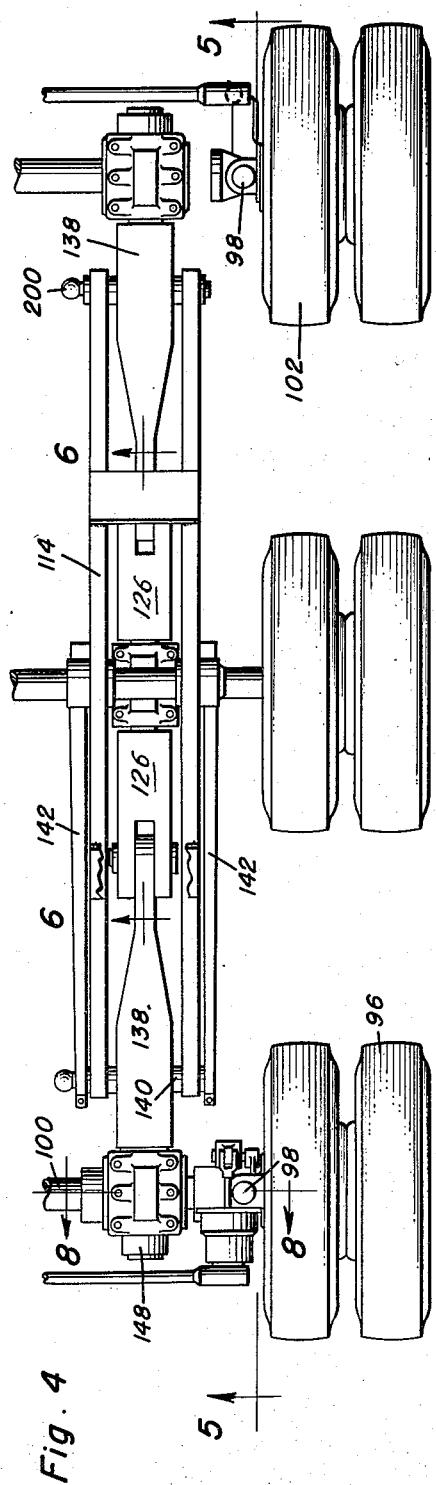
Figure 4 is an enlarged plan view of the suspension system for one-half of the axles.

For purposes of identification, the trailer construction is generally designated by the numeral 10 in Figure 1 with skeletonized longitudinal rails 12 which are interconnected by transverse members 14. The forward end of the trailer 10 is connected to the usual tractor unit 13 having a fifth wheel 15 and in this particular instance the detachable connecting means generally designated by numeral 16 is provided for attachment to a "gooseneck" employed in conjunction with the usual "low-boy" type trailer which is employed for hauling heavy machinery, such as bulldozers, military tanks or the like. The gooseneck is easily removable for facilitating the loading and unloading of the trailer by permitting the front end thereof to be disposed in contact with the ground surface. It is pointed out that the inventive concepts employed in the present invention may be employed with any type of trailer and especially that type which is provided with a fifth wheel control inasmuch as the two central beams 12 are each hollow and provided with an actuating rod 18 disposed therein with the actuating rods 18 being connected to opposite sides of the fifth wheel so that when the tractor unit turns a corresponding movement of the operating rod 18 will be caused. The rear end of each operating rod 18 is provided with length adjusting means 20 with the terminal end thereof being connected to one end of a bell crank 22 generally in the form of a triangular plate having the apex thereof pivoted by pivot pin 24 to a stationary bracket 26 on the frame rail 12. The bell crank 22 extends through a horizontally disposed slot 28 in the frame rail 12 with the bell crank construction 22 being identical on both sides of the trailer. In fact, the construction of the running gear is symmetrical and only one side thereof will be described with it being understood that both sides are the same.

Disposed transversely between the rails 12 is a mounting or supporting member 30 having rearwardly projecting brackets 32 mounted thereon for pivotally receiving one end of a pneumatic cushion unit generally designated by numeral 34. The pneumatic cushion elements 34 are supported on brackets 32 by pivot pins 36. These pneumatic arrangements include generally a cylinder 38 and a piston 40 movable therein with an inflated cushion or bag of resilient material such as rubber disposed therebetween. These units are commercially available and have been employed successfully as spring devices or in lieu of spring devices on load carrying vehicles such as passenger buses or the like. The piston 40 is provided with a bracket 42 which is connected through hinge pin 44 to the apex of a bell crank 46. One end of the bell crank 46 is connected to a bell crank 22 as by pivot pin 48 while the other end of the bell crank 46 is connected to an elongated pivot plate 50 by pivot pin 52.

The elongated pivot plate 50 is supported from a pivot pin 54 on a bracket 56 mounted rigidly on a transverse support member 58 between the longitudinal rails 12 whereby the plate 50 will pivot about the axis formed by pivot pin 54. Disposed slightly forwardly of the pivot pin 54 is a generally oval-shaped opening 60 in plate 50 having the long axis thereof generally parallel to the longitudinal rails 12.

Extending transversely between the longitudinal rails 12 is a shaft 62 having a slide 64 slidably disposed thereon. The slide 64 has an upstanding pin or stud 66 extending into the oval-shaped opening 60 in the plate 50 whereby the slide 64 will be caused to move on the shaft 62 when the plate 50 is pivoted about pivot pin 54. A pair of collars 68 are provided for limiting the sliding movement of the slide 64 thus limiting the sliding or pivoting movement of the plate 50.

The plate 50 is provided with a depending portion 70 connected with a horizontal extending bracket 72 pivotally connected to A-frames 74 by horizontal pivot axle 76 whereby pivotal movement of the plate 50 will be transferred to the forwardly and rearwardly extending A-frames 74 and cause lateral movement thereof and each steering assembly is the same as to the front and rear steering control.

Each of the A-frames 74 is provided with a longitudinally movable socket 78 telescopic with the ends thereof together with a pivot joint 80 connecting the outer end of the socket 78 to a slide 82. Each slide 82 is mounted on a transverse tubular member 84 having parallel longitudinal members 86 rigid therewith. The members 86 are rigid with axles 88 and 100 respectively and form limits for movement of slides 82 and members 86 are rigidly connected by brace members 90. The front slide 82 is connected to a tie rod or drag link 92 by an adjustable link arm 94 whereby the supporting wheels 96 may be pivoted about kingpin 98 when drag link 92 is moved transversely since the pivotal connection between the link 92 and the usual steering arm is spaced from the kingpin thereby providing for steering control of the wheels 96 mounted on the front axle 100. The axles 88 and 100 are hereafter called the steering axles and the wheels 96 and 102 are hereafter called the steerable wheels with both of the sets of wheels being pivoted about a generally vertical kingpin 98 in a conventional manner.

Due to the necessity for pivoting the rear steerable wheels 102 in the opposite direction to the front steerable wheels 96, the rear adjustable link telecopic arm which is designated by numeral 104, similar to arm 94, is supported on a pivot 106 carried by a transverse member 108 attached to the longitudinal members 86 and then is attached to the drag link 110 by using a pivot and longitudinally adjustable joint 112 whereby the drag link 110 may be operated and due to the orientation of drag link 82 in front of wheels 96 and the orientation of drag link 110 behind rear wheels 102, the rear wheels 102 will be pivoted opposite to the front wheels 96 thus steering the trailer about a radius for guiding the same around a curve.

The air cushions 34 and the actuating rods 18 along with centrifugal force of the load on the trailer will aid in turning the wheels with the compressed energy stored in the air cushions 34 exerting a pressure on the steering mechanism so that the pivotal movement of the wheels will occur during approximately three to five revolutions of the wheels wherein the delay from the initial turning movement until the turning movement is applied to the wheels will be sufficient for the tractor to proceed around the curve and let the rear axles reach the point of tangency on the curve.

When the vehicle is turned the wheels will reach the position shown in dotted lines in Figure 2 since the operating rod 18 adjacent upper rail 12 in Figure 2 will initially be moved forwardly by movement of the fifth wheel thus causing pivotal movement of upper bellcrank 22 in one direction with the other rod 18 and bellcrank 22 being moved correspondingly in the opposite direction. The movement of the upper bellcrank 22 caused by upper operating rod 18 will urge the upper piston 40 in the adjacent air cushion 34 inwardly by virtue of bellcrank 46 and pull the piston in the other air cushion outwardly and cause the plate 50 to move about pivot point 54 towards the upper frame rail 12 in Figure 2. The pivotal movement of plate 50 will cause the A-frames 74 to move laterally in the same direction, that is, toward the upper frame rail in Figure 2 thus causing the drag links 92 and 110 to be simultaneously moved in the opposite direction for pivoting the front and rear wheels in the manner shown in Figure 2. The pivoting of the front and rear wheels in opposite directions provides for movement of the trailer about a radius of curvature and eliminates the side skidding or raking of the tires on the front and rear wheels when proceeding around a curve since the trailer will normally pivot about the center wheels. The tendency of the trailer frame or bed to move towards the upper frame rail 12 will carry the A-frames in that direction thus increasing the pivotal movement of the plate 50 towards the upper rail thus increasing the turning action of the wheels. This increase is dampened by the air cushions 34 and the stored energy therein will help return the wheels toward a normal position as the fifth wheel is turned to a normal straight position inasmuch as the operating rods 18 will then return the wheels to a normal position through a lag or delay caused by the application of force by the cushions 34 thereby assuring that the wheels will not straighten up until the trailer is again proceeding in a generally straight line.

In essence, the above described structure is for the purpose of turning the wheels on the front steerable tandem axle in the same direction as the tractor unit of the trailer while turning the wheels on the rear steering axle in an opposite direction thereto causing that portion of the trailer under which the assembly is mounted to move about a radius of curvature substantially the same as that of the pulling tractor unit.

Figure 5:
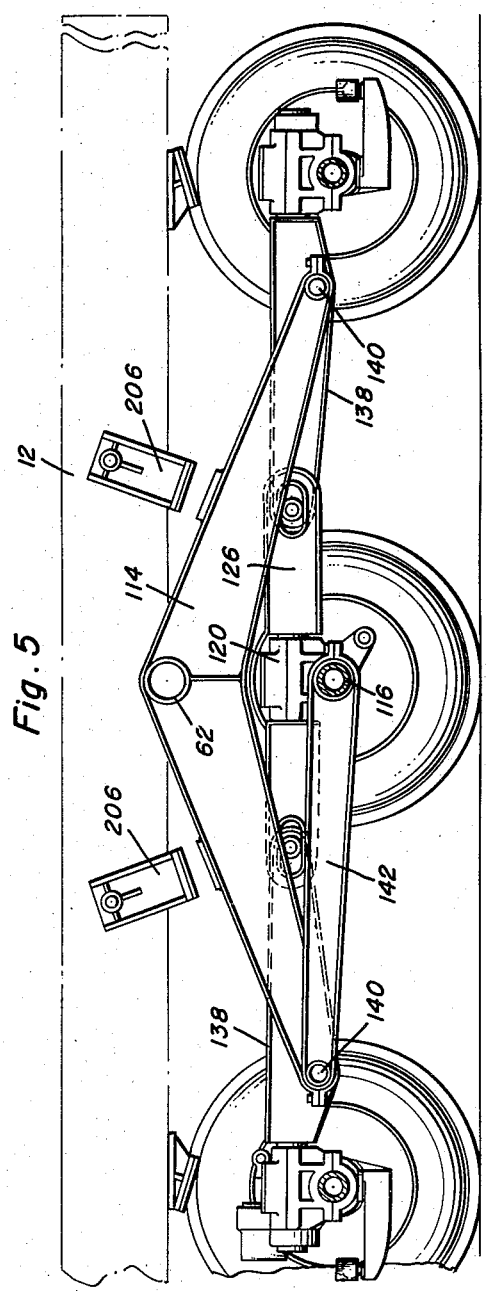
Figure 5 is a sectional view taken generally along a plane passing along section line 5—5 of Figure 4 illustrating further structural details of the suspension arrangement and the relationship of the elements thereof.

Referring now specifically to Figures 4 to 7, the suspension system for the axles is illustrated and includes a walking beam means 114 mounted on the shaft 62. Mounted on the central axle 116 is a clamp 118 having a cylindrical saddle rigidly connected thereto with the saddle being designated by numeral 120. A rocker arm or shaft 122 is journaled in the cylindrical saddle 120 as by bearings 124 and the shaft 122 can rotate about its longitudinal axis in the saddle 120. Cylindrically enlarged portions 126 are rigidly secured to the outer ends of the shaft 122 and thrust bearings 128 are provided between the inner ends of the cylindrical members 126 and the saddle 120.

The outer end of each remote cylindrical portion 122 is provided with a pair of furcations 130 which are spaced from each other and each of which has an elongated slot 132 therein for slidably receiving a transverse pin 134 with bearings having collars 136 thereon for retaining the pins 134 in the slots 132.

The construction of the rocker shaft 122, the cylindrical portions 126, the furcations 130 and the transverse pins 134 forms a central rocker arm secured to the axle for rotation about a substantially longitudinal axis.

Pivotally attached to each of the pins 134 is a forwardly extending arm 138 or a rearwardly extending arm 138, which are identical in construction. This arm 138 is pivotally attached to a pivot shaft 140 extending through the ends of the walking beam 114 and the arm 138 intermediate its ends. As clearly seen in Figure 4, the walking beam 114 is constructed of two spaced members with the arms 138 being disposed therebetween.

Extending forwardly from the central axle 116 is a radius rod 142 which is also constructed of two members and is disposed on either side of the walking beam 114 with the forward end of the radius arm 142 being connected to the forward pivot shaft 140. It is pointed out that the rocker shaft acts in lieu of springs and could be spring means if the same is desired. This suspension arrangement permits independent movement of the axles and Figure 8 is referred to for illustration of the front end of the arm 138 which terminates in a cylindrical extension 144 rotatably received within a bearing saddle 146 and retained therein by a collar 148. The bearing saddle 146 is also provided with a transverse bore 150 rotatably receiving and slidably mounted on the steering axle 152 having the vertical king-pin bore 154 at the outer end thereof. A cylindrical collar 156 is disposed in surrounding relation to the axle portion 152 and includes an inwardly extending flange 158 in abutting engagement with the outer edge of the saddle 146. Disposed within the area between the axle portion 152 and the annular collar 156 is a cylindrical member of compression rubber 160 which does not fill the area between the flange 158 on the collar 156 and a stationary flange 162 welded to the axle portion 152. The compressibility of the rubber 160 will permit limited lateral movement of the saddle 146 on the axle portion 152 thus permitting the front axle to raise and lower in relation to the other axles and permitting limited lateral movement of the arm 138 in relation to the axle.

Referring specifically to Figures 9 and 10 of the drawings, it will be seen that a simplified version of the invention is provided for the two-axle assembly with the frame 170 being provided with depending brackets 172 receiving a transverse shaft 174 having a walking beam 176 pivotally mounted thereon with the walking beam being connected to a forward axle 178 and a rear axle 180 through the same type of construction as illustrated in Figure 8 with the extension 144 being rigidly secured to opposite ends of the walking beam 176 thus permitting the necessary and independent movement of the axles.

A similar control apparatus is employed including the pneumatic cushions 180, the pivot plate 182, a slide 184 and an arm 186 connected to the drag link 188 for pivoting the wheel 190 about the pivot pin or king-pin 192. In this construction, only the rear wheels are pivotal since the front wheels may remain in a stationary position and pivot about their points of contact with the ground surface.

Various shock absorbers may be employed wherever desired and it is noted that the remote ends of the walking beam 114 are provided with inwardly extending ball members 200 which are adapted to engage in rubber type sockets 202 for generally limiting and cushioning movement of the members 86 as well as connecting the various elements together. Also, stop means 206 may be provided between the walking beam and the frame rails 12 for limiting the movement thereof and other conventional auxiliary means may be employed for maintaining the frame in a desired level condition and limiting the movement between the frame and the running gear.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tandem axle arrangement for trailers having a trailer frame and adapted to be towed by a tractor unit which is provided with a fifth wheel assembly for connection with the front of the trailer comprising three transversely arranged axles, an elongated walking beam connected to the trailer frame, a rocker arm connected to the central axle, a control arm pivotally connected to each outer end of the rocker arm mounted on the central axle with the outer end of each control arm being connected to the forward and rear axles, respectively, said control arms being connected to the ends of said walking beam inwardly of the forward and rear axles, and a radius rod connected to said central axle and to the pivotal connection between the front end of the walking beam and the control arm.

2. The combination of claim 1 wherein each control arm has the outer end thereof connected to its respective axle through a connecting means having a rotatable and slidable attachment to the axle, said sliding movement being permitted by rubber in compression thus limiting the lateral movement of the arm in relation to the axle for permitting elevational changes of the axle.

3. The combination of claim 2 wherein the connection between each end of the rocker arm and the control arm is a pin and slot connection for permitting changes in angular relation and effective length of the distance between the axles during elevation of one axle in relation to the other.

4. The combination of claim 1 wherein the forward and rear axles are provided with steerable wheels on the outer ends thereof, and means for controlling the position of the steerable wheels, said means being operable in response to pivotal movement of the fifth wheel on the tractor unit and in response to the application of centrifugal force as the vehicle rounds a curve.

5. The combination of claim 4 wherein said control means for the steerable wheels includes a pivotal control plate having a slide operably connected to forward and rear drag links, said pivotal plate being cushioned by pneumatic cushioning means for storing a portion of the energy for pivoting the wheels whereby the pivotal movement of the wheels about a vertical axis will be delayed until such time as the tractor unit is into a curve and the trailer starts into the curve.

6. The combination of claim 5 wherein said control means includes a pair of operating rods connected to opposite sides of the fifth wheel assembly on the tractor unit, a pivot plate arranged longitudinally with one end being pivotally attached to the trailer frame, linkage means interconnecting the pivot plate and said operating rods, pneumatic means connected to said linkage means for balancing the pivot plate to a central position, means limiting movement of the pivot plate, and an A-frame extending forwardly and rearwardly from said pivot plate, said A-frames being connected to the control means adjacent the forward end rear axles for controlling the steerable wheels thereon.

7. The combination of claim 6 wherein said rearwardly and forwardly extending A-frames are connected to the control means through a centrally pivoted link whereby the direction of pivotal movement of the wheels on the rear axle is opposite from the wheels on the front axle whereby the wheels on the three axles will track in a smooth curved path.

8. The combination of claim 6 wherein said pivot plate is mounted through a pin and slot connection to a lateral slide, said means for limiting movement of the pivot plate including stop means in the path of said slide, the lateral movement of the trailer frame causing movement of the pivot plate thus increasing the steering action of the A-frames.

9. A tandem axle arrangement for trailers having a trailer frame and adapted to be towed by a tractor unit which is provided with a fifth wheel assembly for connection with the front of the trailer, said arrangement comprising at least a pair of transversely arranged and longitudinally spaced axles having wheel assemblies on the outer ends thereof, an elongated walking beam connected to the trailer frame, a longitudinally extending extension on each end of the walking beam, the outer end of each extension being disposed in perpendicular relation and rotatably connected with the axles respectively, each axle having a rotatable and slidable sleeve thereon, means on the sleeve rotatably receiving the extension whereby the axle may rotate about its own axis, about the axis of the extensions and move in an arcuate swinging manner, and compressible means anchored to the axle and engaging one end of the sleeve limiting the sliding movement of said sleeve thus limiting the lateral movement of the extension in relation to the axle for permitting elevational changes of the wheel assemblies.

10. The combination of claim 9 wherein the rearmost of said axles is provided with steerable wheels mounted on the outer end thereof for pivotal movement about a vertical axis, each steerable wheel having a steering arm connected thereto with the steering arms being connected by a drag link, and means connected to the drag link for moving the drag link in response to turning movement of the tractor unit and fifth wheel when the tractor unit and trailer negotiate a curve.

11. The combination of claim 10 wherein said means for moving the drag link is also connected with the trailer frame and operable in response to lateral movement of the trailer frame caused by application of centrifugal force on the trailer frame as the trailer negotiates a curve.

12. The combination as defined in claim 9 wherein said compressible means includes a cylindrical member of compressible rubber encircling the axle, means on said axle engaging one end of the cylindrical member of compressible member for preventing movement thereof, a collar encircling the compressible rubber member, said collar being slidably mounted on the axle and including an inwardly extending flange disposed between the end of the compressible rubber member and the end of the sleeve for preventing contact between the compressible rubber member and the sleeve.

References Cited in the file of this patent

UNITED STATES PATENTS

| | | |
|---|---|---|
| 2,718,408 | Jungwirth | Sept. 20, 1955 |
| 2,749,140 | Hughes | June 5, 1956 |
| 2,754,132 | Martin | July 10, 1956 |
| 2,785,909 | Barnard | Mar. 19, 1957 |